(No Model.)
E. JONES.
DRAFTSMAN'S MICROMETER SCALE.
No. 470,490. Patented Mar. 8, 1892.
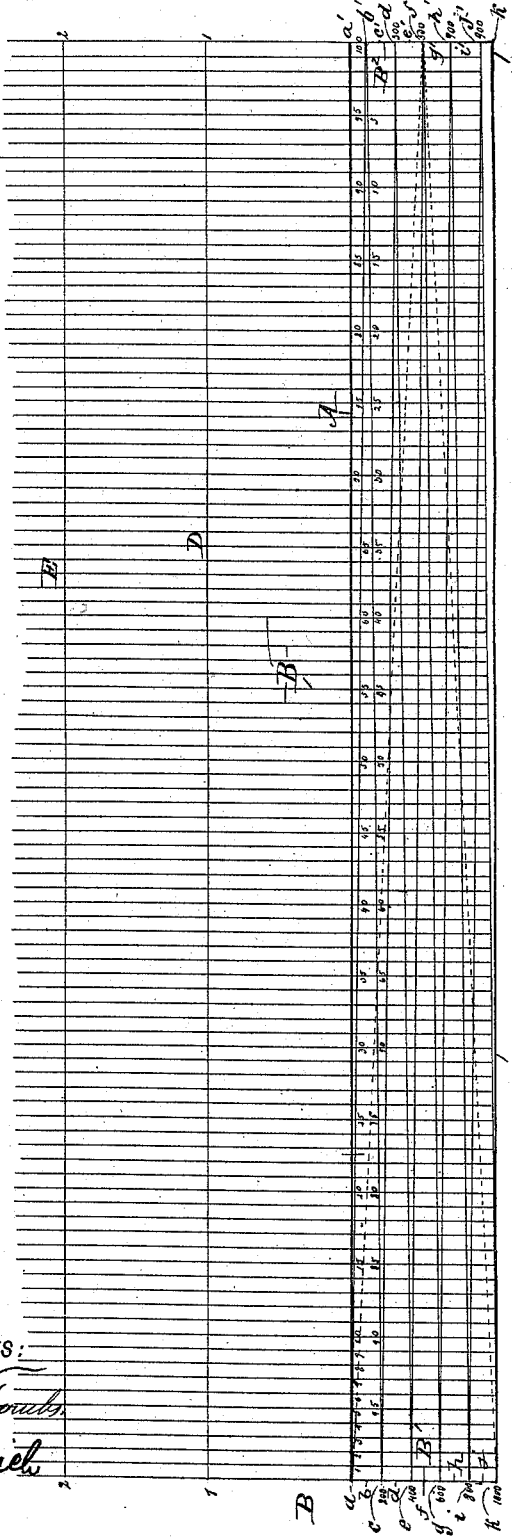
WITNESSES:
INVENTOR:
Edmund Jones
BY
ATTORNEYS

United States Patent Office.

EDMUND JONES, OF COLD SPRING HARBOR, NEW YORK.

DRAFTSMAN'S MICROMETER-SCALE.

SPECIFICATION forming part of Letters Patent No. 470,490, dated March 8, 1892.

Application filed March 2, 1891. Serial No. 383,481. (No model.)

*To all whom it may concern:*

Be it known that I, EDMUND JONES, a citizen of the United States, residing at Cold Spring Harbor, in the county of Suffolk and State of New York, have invented a new and useful Improvement in Micrometer-Scales, of which the following is a specification.

The object of this invention is to provide a micrometer-scale which is simpler and more compact in form, more accurate, and more convenient in use than those heretofore generally employed.

To the end that my invention may be clearly understood, I shall omit all preliminary description and proceed to a detail description thereof, after which I shall distinctly point out and claim the invention.

Reference is to be had to the accompanying drawing, forming a part of this specification, in which the figure is a face view of a micrometer-scale embodying my invention.

The scale thus illustrated as an example is designed to give the thousandths of an inch, and to this end the straight transverse zero-line A is drawn in this instance exactly ten inches in length and divided into one hundred parts, which are marked by parallel lines B, crossing the zero-line A at right angles thereto. The lines B extend from the zero-line A in one direction, which we will term "downward," to a unit-line C, parallel to, exactly one inch below, and of the same length as the zero-line A, and upward and beyond the zero-line A to any desired uniform length, preferably about that of the longest lines it is expected to measure with the scale. Above the zero-line are transverse lines D E F, &c., parallel to and at distances from the zero-line A of, respectively, one, two, three inches, &c., and numbered 1 2 3, &c., accordingly. The inch-long extensions $B'$ $B^2$ of the two outside side lines B below the zero-line A are each divided into ten equal parts, each thus one-tenth of an inch long, marked by points $a$ $b$ $c$, &c., and $a'$ $b'$ $c'$, &c., respectively. The pairs of points $a$ $b'$, $b'$ $c$, $c$ $d'$, $d'$ $e$, $e$ $f'$, $f'$ $g$, $g$ $h'$, $h'$ $i$, $i$ $j'$, and $j'$ $k$ are consecutively connected by straight lines, which thus intersect the longitudinal lines B obliquely at points whose distance from the zero-line A by a well-known geometrical principle, will be equal to that of the initial points $a$ $b'$ $c$, &c., of said oblique lines in tenths of an inch, plus as many thousandths of an inch as such intersecting lines B are in number distant from said initial points $a$ $b'$ $c$, &c., of the oblique lines. The initial points $a$ $b'$ $c$, &c., are therefore marked "0," "$\frac{100}{1000}$," (1/10,) "$\frac{200}{1000}$," &c., and the oblique lines $a$ $b'$, $b'$ $c$, &c., at their intersections with the lines B are each marked from "1" to "100," commencing with their initial points $a$ $b'$ $c$, &c., Thus to measure two and six hundred and sixty-six thousandths inches by this scale take off the distance from the intersection of the oblique line marked "$\frac{600}{1000}$," with the line B, marked "66," on said line B to the transverse line E, marked "2." In a similar manner a scale may be constructed to measure to any fraction of any unit of length, the distance between the zero-line A and line C being made equal to said unit, the parts $B'$ $B^2$ subdivided to give fractions of said unit, and the transverse space between said extensions being also subdivided by equidistant longitudinal lines B to the desired fraction of the aforesaid fraction, which lines B are intersected by oblique lines connecting consecutively alternate subdivisions of the extreme unit extensions $B'$ $B^2$. The distance between the extreme unit-extensions $B'$ $B^2$ is of course immaterial, save for convenience.

This scale may be etched on glass or metal for a standard by any of the accurate processes in vogue and other scales adjusted therefrom, measurements being taken off the same by dividers or calipers or otherwise.

The dotted lines shown in the drawing illustrate the plan of a scale to measure to two-hundredths of an inch, according to my invention.

I claim as my invention—

The improved micrometer-scale herein shown and described for measuring divisions of a unit smaller than a one-hundredth, the same consisting of a plane surface having thereon parallel straight lines A C, &c., said unit's distance apart, but of equal and as many as ten times said unit's length, equidistant straight lines B, in number a multiple of ten, intersecting the lines A C at a right angle and subdividing the lines A C into a multiple of ten equal parts, the parts B' B² of the outside lines B, connecting the ends of the lines A C, being subdivided into ten equal parts, and straight lines connecting the divisions of the line B' with the succeeding divisions of the line B² and intersecting the lines B obliquely, as set forth.

EDMUND JONES.

Witnesses:
CLARENCE L. BURGER,
ROSCOE C. TOOMBS.

Correction in Letters Patent No. 470,490.

It is hereby certified that in Letters Patent No. 470,490, granted March 8, 1892, upon the application of Edmund Jones, of Cold Spring Harbor, New York, for an improvement in "Draftsmen's Micrometer-Scales," an error appears in the printed specification requiring the following correction, viz.: In lines 98 and 99, page 1, the clause "and as many as ten times," should read *and many, as ten, times;* and that the said Letters Patent should be read with this correction therein that the same may conform to the record of the case in the Patent Office.

Signed, countersigned, and sealed this 15th day of March, A. D. 1892.

[SEAL.]

CYRUS BUSSEY,
*Assistant Secretary of the Interior.*

Countersigned:
W. E. SIMONDS,
*Commissioner of Patents.*